(12) United States Patent
Dillard

(10) Patent No.: US 10,786,073 B1
(45) Date of Patent: Sep. 29, 2020

(54) TABLE ATTACHABLE TRAY ASSEMBLY

(71) Applicant: Anthony Dillard, Sparta, NC (US)

(72) Inventor: Anthony Dillard, Sparta, NC (US)

( * ) Notice: Subject to any disclaimer, the term of this patent is extended or adjusted under 35 U.S.C. 154(b) by 0 days.

(21) Appl. No.: 16/419,062

(22) Filed: May 22, 2019

(51) Int. Cl.
*A47B 13/14* (2006.01)
*F16B 5/00* (2006.01)

(52) U.S. Cl.
CPC .............. *A47B 13/14* (2013.01); *F16B 5/004* (2013.01); *A47B 2200/0084* (2013.01); *A47B 2220/0036* (2013.01)

(58) Field of Classification Search
CPC ............ A47B 13/14; A47B 5/00; D06F 81/06
USPC ............ 108/152, 42, 47; 297/174 R, 174 CS
See application file for complete search history.

(56) References Cited

U.S. PATENT DOCUMENTS

| | | | |
|---|---|---|---|
| 755,536 A | 3/1904 | Pokorny | |
| 1,108,692 A | 8/1914 | Burd | |
| 1,878,864 A | 9/1932 | Lane | |
| 2,090,176 A | 8/1937 | Besancon | |
| 2,558,323 A | 6/1951 | Strun | |
| 2,580,144 A | 12/1951 | Webster | |
| 2,709,563 A | 5/1955 | Starkey | |
| 2,710,643 A * | 6/1955 | Wincey | A47D 1/106 297/174 CS |
| 2,713,530 A | 7/1955 | Chisholm | |
| 2,867,401 A * | 1/1959 | Sheahan | A47C 7/68 248/231.41 |
| 2,988,310 A * | 6/1961 | Wright | A45B 11/00 248/511 |
| 3,059,965 A * | 10/1962 | Fornetti | A47D 1/106 297/174 CS |
| 3,181,485 A * | 5/1965 | Dotson | A47B 31/06 108/97 |
| 3,289,615 A | 12/1966 | Marschalk | |
| 3,397,010 A * | 8/1968 | Leimgruber | A47D 1/02 297/174 CS |
| 4,850,282 A * | 7/1989 | Postic | A47B 23/04 108/47 |
| 5,205,222 A * | 4/1993 | Bernard | D06F 79/02 108/42 |
| 5,282,427 A * | 2/1994 | Steinhilber | A47B 21/03 108/152 |
| 5,722,329 A * | 3/1998 | Weng | A47B 5/00 108/152 |
| 6,679,549 B2 * | 1/2004 | Catelli | A47D 1/106 297/174 CS |
| 7,651,161 B2 * | 1/2010 | Anselmi | A47D 1/106 297/174 CS |
| 8,511,240 B1 * | 8/2013 | Strock | A47B 96/065 108/98 |
| 8,820,548 B2 * | 9/2014 | Wilson | A47G 23/06 211/133.6 |

(Continued)

*Primary Examiner* — Jose V Chen

(57) ABSTRACT

A table attachable tray assembly for use by a child without a booster seat includes a plate and a pair of brackets. The brackets are coupled to and extend from a rear edge of the plate and are positioned singly proximate to opposing sides of the plate. The brackets are configured to couple to a tabletop so that the plate is positioned parallel to and lower than the tabletop. The plate is configured to position tableware, food, and a beverage so that the tableware, the food, and the beverage are accessible to a child who is seated in a nonaugmented chair that is positioned proximate to the plate.

17 Claims, 5 Drawing Sheets

(56) References Cited

U.S. PATENT DOCUMENTS 8,985,033 B1 * 3/2015 Whitlock .......... A61M 37/0076
108/152

* cited by examiner

TABLE ATTACHABLE TRAY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to tray assemblies and more particularly pertains to a new tray assembly for use by a child without a booster seat.

BRIEF SUMMARY OF THE INVENTION

An embodiment of the disclosure meets the needs presented above by generally comprising a plate and a pair of brackets. The brackets are coupled to and extend from a rear edge of the plate and are positioned singly proximate to opposing sides of the plate. The brackets are configured to couple to a tabletop so that the plate is positioned parallel to and lower than the tabletop. The plate is configured to position tableware, food, and a beverage so that the tableware, the food, and the beverage are accessible to a child who is seated in a nonaugmented chair that is positioned proximate to the plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
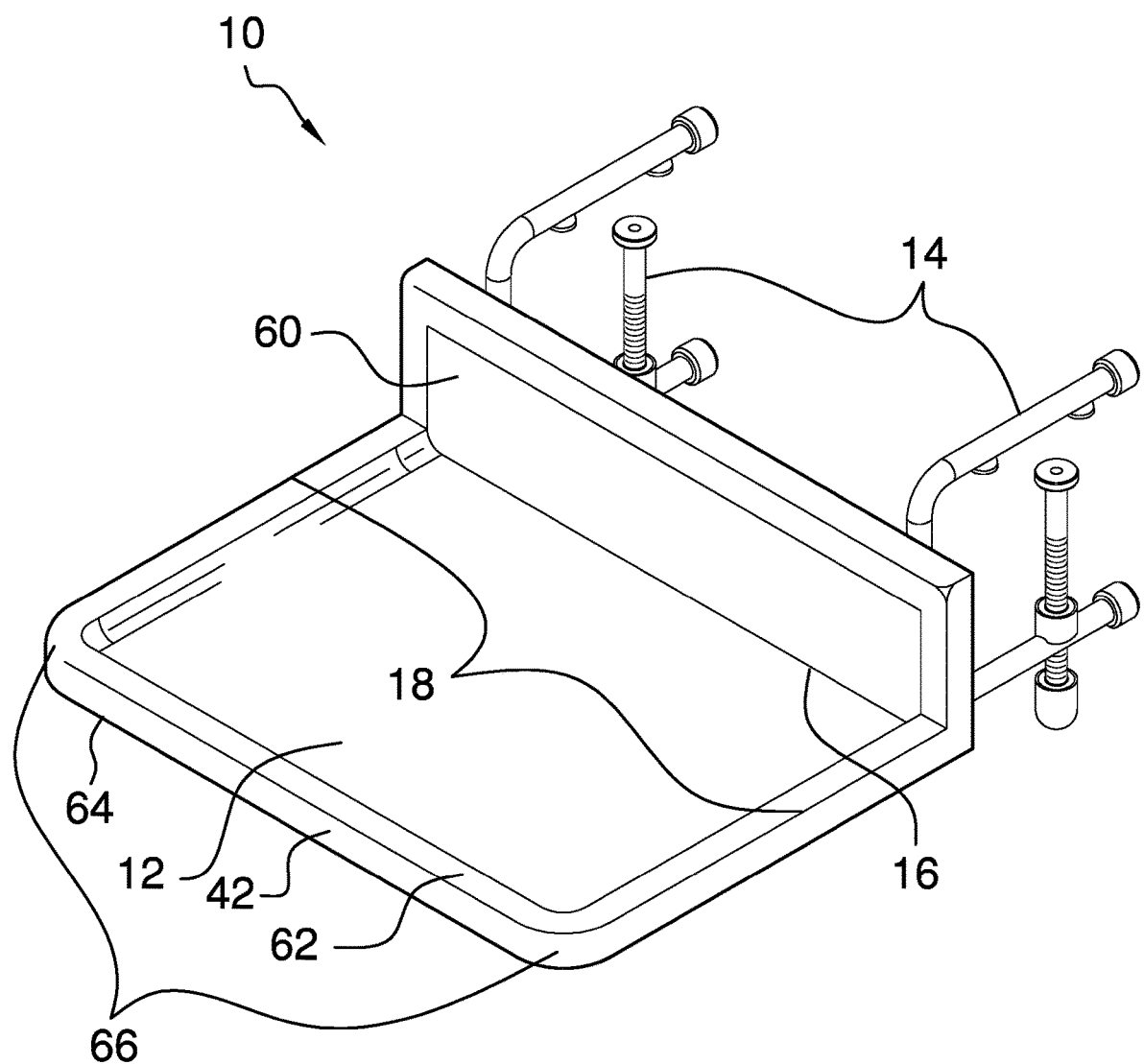
FIG. 1 is an isometric perspective view of a table attachable tray assembly according to an embodiment of the disclosure.
Figure 2:
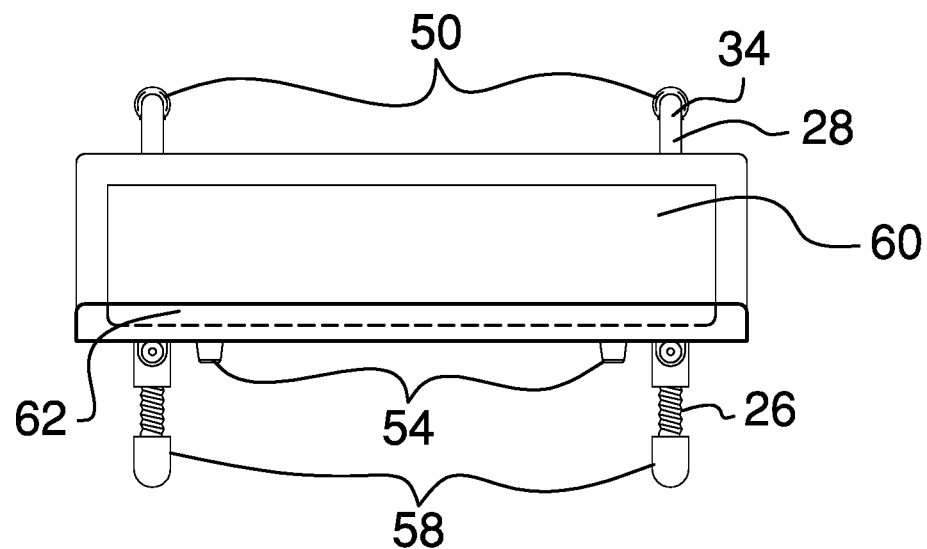
FIG. 2 is a front view of an embodiment of the disclosure.

With reference now to the drawings, and in particular to FIGS. 1 through 7 thereof, a new tray assembly embodying the principles and concepts of an embodiment of the disclosure and generally designated by the reference numeral 10 will be described.

As best illustrated in FIGS. 1 through 7, the table attachable tray assembly 10 generally comprises a plate 12 and a pair of brackets 14. The plate 12 is substantially rectangularly shaped, thus defining a pair of front corners 66. The front corners 66 are arcuate. The plate 12 comprises at least one of metal, wood, and plastic.

Figure 7:
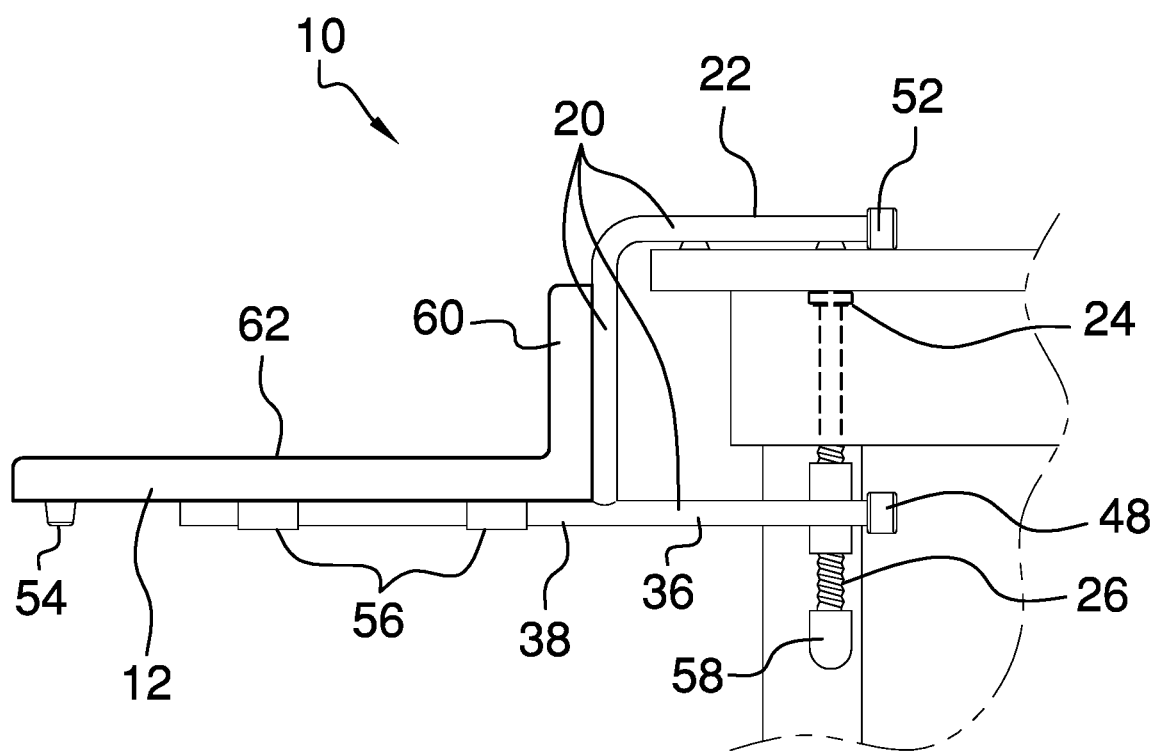
FIG. 7 is an in-use view of an embodiment of the disclosure.

The brackets 14 are coupled to and extend from a rear edge 16 of the plate 12 and are positioned singly proximate to opposing sides 18 of the plate 12. The brackets 14 are configured to couple to a tabletop so that the plate 12 is positioned parallel to and lower than the tabletop, as shown in FIG. 7. The plate 12 is configured to position tableware, food, and a beverage so that the tableware, the food, and the beverage are accessible to a child who is seated in a nonaugmented chair (not shown) that is positioned proximate to the plate 12.

The brackets 14 are C-clamp type wherein a frame 20 of the bracket 14 is configured to be positioned in abutment with an edge of the tabletop. A fixed jaw 22 and a movable jaw 24 of each bracket 14 are configured to be positioned on an upper surface and proximate to a lower surface of the tabletop, respectively. An adjustment screw 26 that is rotationally coupled to the movable jaw 24 and threadedly coupled to the frame 20 of the bracket 14 is configured to be rotated to bring the movable jaw 24 into frictional abutment with the lower surface of the tabletop to couple the bracket 14 to the tabletop. As the brackets 14 are C-clamp type, they are readily positionable around a skirting that may be coupled to the lower surface of the tabletop, as shown in FIG. 7. The assembly 10 thus is selectively attachable to tabletops having a variety of configurations.

Figure 3:
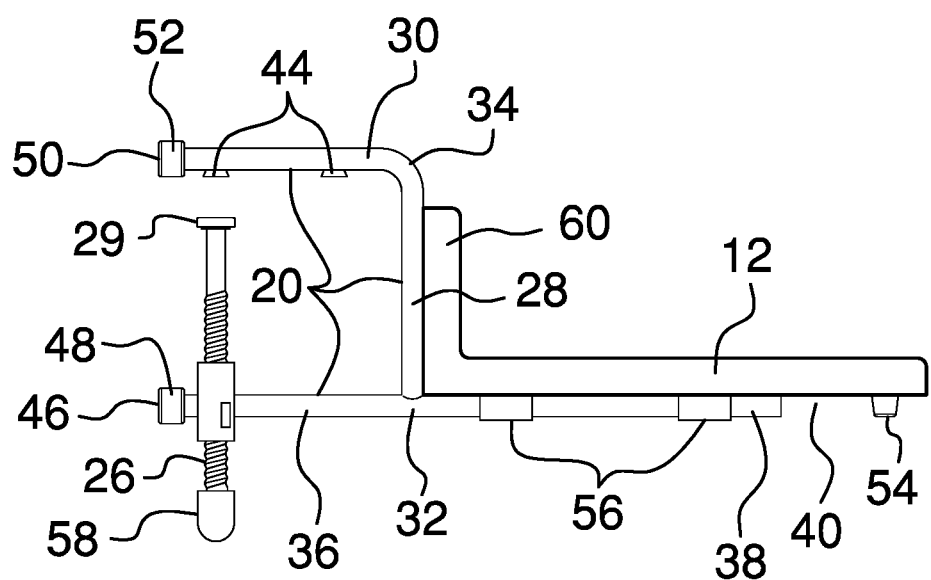
FIG. 3 is a side view of an embodiment of the disclosure.
Figure 4:
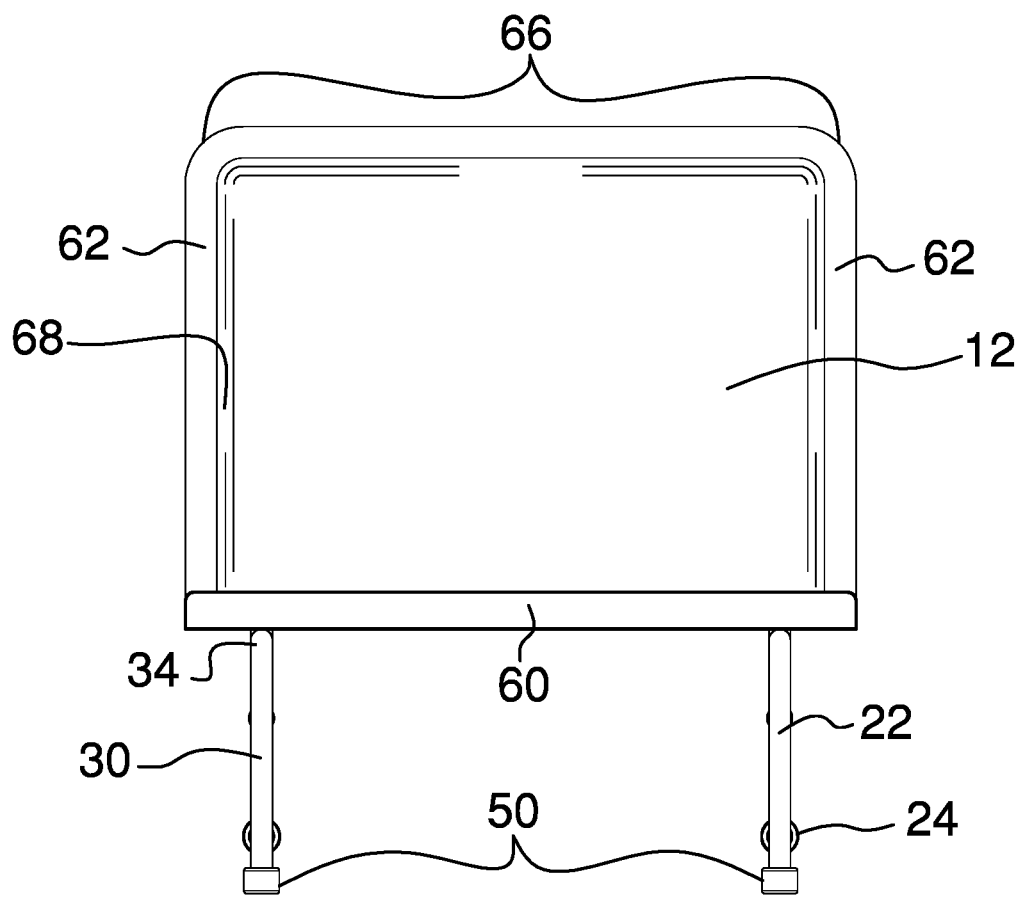
FIG. 4 is a top view of an embodiment of the disclosure.
Figure 5:
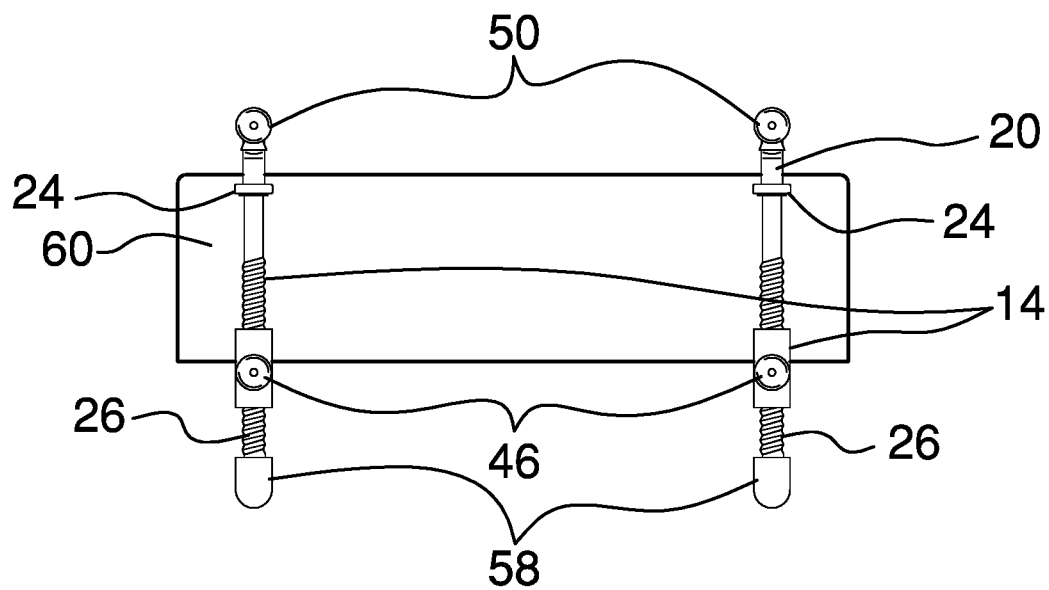
FIG. 5 is a rear view of an embodiment of the disclosure.

The frame 20 comprises a first rod 28, a second rod 30, and a third rod 32. The first rod 28 extends perpendicularly to the plate 12 from the rear edge 16 of the plate 12. The second rod 30 is coupled to and extends perpendicularly from an upper end 34 of the first rod 28 so that the second rod 30 is parallel to the plate 12 and opposingly positioned to the plate 12 relative to the first rod 28. The second rod 30 comprises the fixed jaw 22. The third rod 32 is coupled to and extends bidirectionally from the first rod 28 proximate to the plate 12. A first section 36 of the third rod 32 extends in parallel and codirectionally with the first rod 28. A second section 38 of the third rod 32 extends along a lower face 40 of the plate 12 toward a front edge 42 of the plate 12, as shown in FIG. 3. The second section 38 is positioned to support the plate 12. The adjustment screw 26 is threadedly coupled to and extends perpendicularly from the first section 36 of the third rod 32 distal from the first rod 28. The first rod 28, the second rod 30, the third rod 32, and the adjustment screw 26 are substantially coplanar. The movable jaw 24 is padded.

Each of a plurality of pads 44 that is coupled to a respective second rod 30 is configured to contact the upper surface of the tabletop to enhance coupling of the bracket 14 to the tabletop. The pads 44 also serve to prevent damage to the upper surface of the tabletop. The pads 44 comprises at least one of rubber, silicone, and plastic. The plurality of pads 44 comprises four pads 44 that are positioned two-apiece on each of the second rods 30.

Each of a pair of first caps 46 is positioned over an endpoint 48 of a first section 36 of a respective third rod 32 distal from an associated first rod 28. Each of a pair of second caps 50 is coupled to a terminus 52 of a respective second rod 30 distal from an associated first rod 28. The first caps 46 and the second caps 50 are configured to protect the tabletop from damage during placement of the bracket 14 on the tabletop. The first caps 46 and the second caps 50 comprises at least one of rubber, silicone, and plastic.

A pair of nubs 54 is coupled to and extends from the lower face 40 proximate to the front edge 42 of the plate 12. The nubs 54 are positioned singly proximate to the opposing sides 18 of the plate 12. The nubs 54 are configured to protect arms of the chair from damage. The nubs 54 comprises at least one of rubber, silicone, and plastic.

Figure 6:
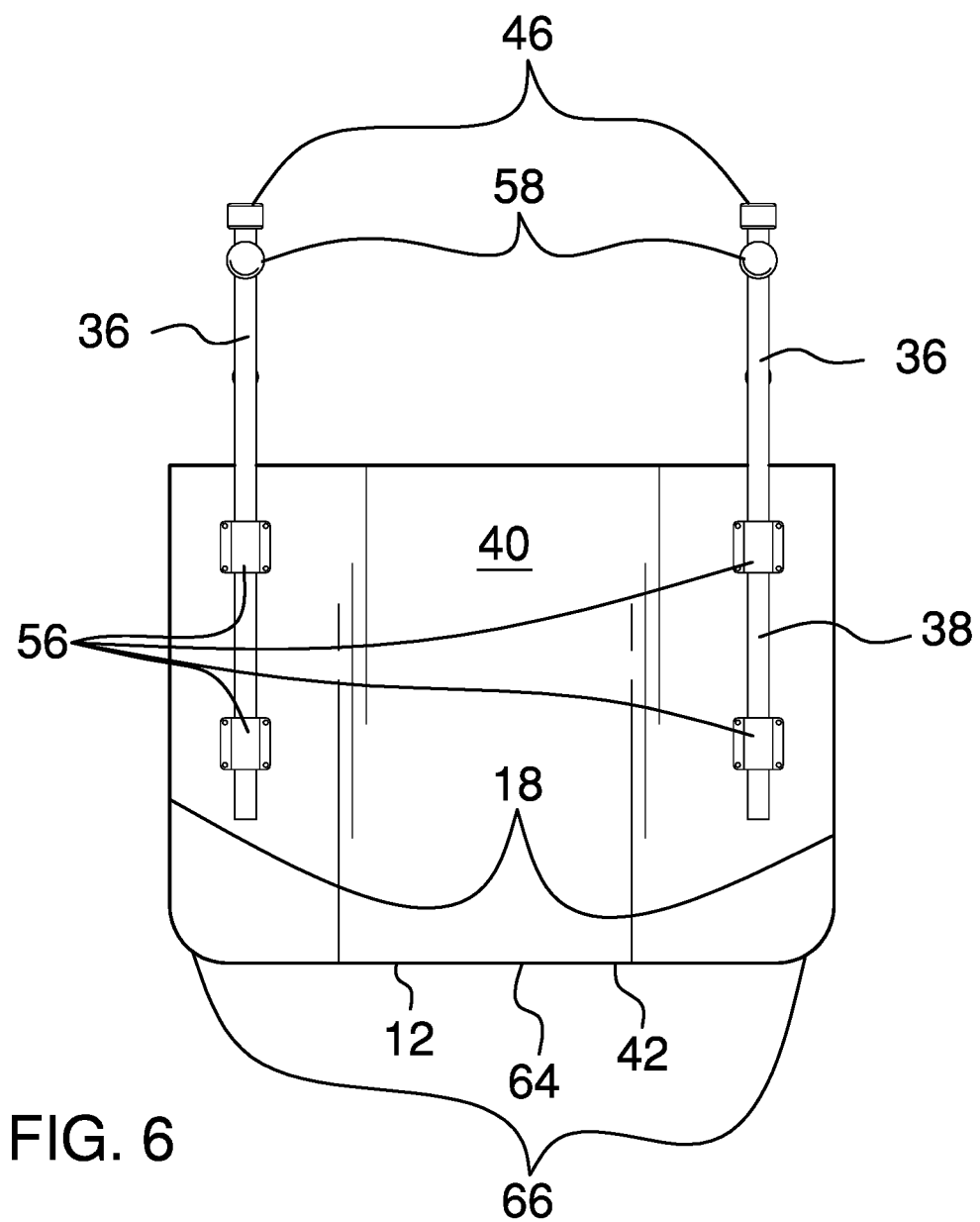
FIG. 6 is a bottom view of an embodiment of the disclosure.

Each of a pair plurality of connectors 56 is coupled to the plate 12 and a respective second section 38 of an associated third rod 32 so that the respective second section 38 is fixedly coupled to the plate 12. The plurality of connectors 56 comprises four connectors 56 that are coupled two-apiece to each second section 38, as shown in FIG. 6. The connectors 56 are tube strap type.

Each of a pair of knobs 58 is coupled to a respective adjustment screw 26 distal from the movable jaw 24. The knob 58 is configured to be grasped in digits of a hand of a user to facilitate turning of the adjustment screw 26. The knobs 58 on the adjustment screws 26 facilitate rapid attachment and detachment of the assembly 10 to the tabletop.

A backsplash 60 is coupled to and extends perpendicularly from the plate 12 adjacent to the rear edge 16. The backsplash 60 is configured to deflect food particles and splashes back onto the plate 12. A lip 62 that is coupled to a perimeter 64 of the plate 12 extends along the opposing sides 18 and the front edge 42 of the plate 12. The lip 62 and the backsplash 60 are configured to retain liquid that is spilled upon the plate 12. The lip 62 has an inner face 68 that is arcuately beveled to facilitate cleaning of the plate 12.

In use, the brackets 14 are coupled to the tabletop so that the plate 12 is positioned parallel to and lower than the tabletop. The adjustment screws 26 are used to tighten the brackets 14 to the tabletop. The plate 12 thus is configured to position the tableware, the food, and the beverage so that they are accessible to the child who is seated in the non-augmented chair that is positioned proximate to the plate 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A table attachable tray assembly comprising:
   a plate; and
   a pair of brackets coupled to and extending from a rear edge of the plate, the brackets being positioned singly proximate to opposing sides of the plate wherein the brackets are configured for coupling to a tabletop such that the plate is positioned parallel to and lower than the tabletop wherein the plate is configured for positioning tableware, food, and a beverage such that the tableware, the food, and the beverage are accessible to a child seated in a nonaugmented chair positioned proximate to the plate, the brackets being C-clamp type wherein a frame of the bracket is configured for positioning in abutment with an edge of the tabletop such that a fixed jaw and a movable jaw of each bracket are configured for positioning on an upper surface and proximate to a lower surface of the tabletop, respectively, wherein an adjustment screw of the bracket rotationally coupled to the movable jaw and threadedly coupled to the frame of the bracket is configured for being rotated for bringing the movable jaw into frictional abutment with the lower surface of the tabletop for coupling the bracket to the tabletop, the frame comprising
   a first rod,
   a second rod, and
   a third rod, the first rod extending perpendicularly to the plate from the rear edge of the plate, the second rod being coupled to and extending perpendicularly from an upper end of the first rod such that the second rod is parallel to the plate and opposingly positioned to the plate relative to the first rod, the second rod comprising the fixed jaw, the third rod being coupled to and extending bidirectionally from the first rod proximate to the plate such that a first section of the third rod extends in parallel and codirectionally with the first rod and a second section of the third rod extends along a lower face of the plate toward a front edge of the plate such that the second section is positioned for supporting the plate, the adjustment screw being threadedly coupled to and extending perpendicularly from the first section of the third rod distal from the first rod such that the first rod, the second rod, the third rod, and the adjustment screw are substantially coplanar;

a plurality of pads, each pad being coupled to a respective second rod wherein the pad is configured for contacting the upper surface of the tabletop for enhancing coupling of the bracket to the tabletop and for preventing damage to the upper surface of the tabletop;

a pair of first caps, each first cap being positioned over an endpoint of a first section of a respective third rod distal from an associated first rod wherein the first caps are configured for protecting the tabletop from damage during placement of the bracket on the tabletop; and a pair of second caps, each second cap being coupled to a terminus of a respective second rod distal from an associated first rod wherein the second caps are configured for protecting the tabletop from damage during placement of the bracket on the tabletop, a lowermost portion of an outer surface of each second cap being coplanar with respective contact surfaces of said pads.

2. The assembly of claim 1, further including the plate being substantially rectangularly shaped defining a pair of front corners of the plate.

3. The assembly of claim 2, further including the front corners being arcuate.

4. The assembly of claim 1, further including the plate comprising at least one of metal, wood, and plastic.

5. The assembly of claim 1, further comprising the movable jaw being padded.

6. The assembly of claim 5, further including the pads comprising at least one of rubber, silicone, and plastic.

7. The assembly of claim 5, further including the plurality of pads comprising four pads positioned two-apiece on each of the second rods.

8. The assembly of claim 1, further comprising:

a pair of nubs coupled to and extending from the lower face proximate to the front edge of the plate, the nubs being positioned singly proximate to the opposing sides of the plate wherein the nubs are configured for protecting arms of the chair from damage.

9. The assembly of claim 8, further including the first caps, the second caps, and the nubs comprising at least one of rubber, silicone, and plastic.

10. The assembly of claim 1, further including a plurality of connectors, each connector being coupled to the plate and a respective second section of an associated third rod such that the respective second section is fixedly coupled to the plate.

11. The assembly of claim 10, further including the plurality of connectors comprising four connectors coupled two-apiece to each second section.

12. The assembly of claim 10, further including the connectors being tube strap type.

13. The assembly of claim 1, further including a pair of knobs, each knob being coupled to a respective adjustment screw distal from the movable jaw wherein the knob is configured for grasping in digits of a hand of a user for facilitating turning of the respective adjustment screw.

14. The assembly of claim 1, further including a backsplash coupled to and extending perpendicularly from the plate adjacent to the rear edge wherein the backsplash is configured for deflecting food particles and splashes back onto the plate.

15. The assembly of claim 14, further including a lip coupled to a perimeter of the plate, the lip extending along the opposing sides and a front edge of the plate wherein the lip and the backsplash are configured for retaining liquid spilled upon the plate.

16. The assembly of claim 15, further including the lip having an inner face, the inner face being arcuately beveled.

17. A table attachable tray assembly comprising:

a plate, the plate being substantially rectangularly shaped defining a pair of front corners, the front corners being arcuate, the plate comprising at least one of metal, wood, and plastic;

a pair of brackets coupled to and extending from a rear edge of the plate, the brackets being positioned singly proximate to opposing sides of the plate wherein the brackets are configured for coupling to a tabletop such that the plate is positioned parallel to and lower than the tabletop wherein the plate is configured for positioning tableware, food, and a beverage such that the tableware, the food, and the beverage are accessible to a child seated in a nonaugmented chair positioned proximate to the plate, the brackets being C-clamp type wherein a frame of the bracket is configured for positioning in abutment with an edge of the tabletop such that a fixed jaw and a movable jaw of each bracket are configured for positioning on an upper surface and proximate to a lower surface of the tabletop, respectively, wherein an adjustment screw of the bracket rotationally coupled to the movable jaw and threadedly coupled to the frame of the bracket is configured for being rotated for bringing the movable jaw into frictional abutment with the lower surface of the tabletop for coupling the bracket to the tabletop, the frame comprising a first rod, a second rod, and a third rod, the first rod extending perpendicularly to the plate from the rear edge of the plate, the second rod being coupled to and extending perpendicularly from an upper end of the first rod such that the second rod is parallel to the plate and opposingly positioned to the plate relative to the first rod, the second rod comprising the fixed jaw, the third rod being coupled to and extending bidirectionally from the first rod proximate to the plate such that a first section of the third rod extends in parallel and codirectionally with the first rod and a second section of the third rod extends along a lower face of the plate toward a front edge of the plate such that the second section is positioned for supporting the plate, the adjustment screw being threadedly coupled to and extending perpendicularly from the first section of the third rod distal from the first rod such that the first rod, the second rod, the third rod, and the adjustment screw are substantially coplanar, the movable jaw being padded;

a plurality of pads, each pad being coupled to a respective second rod wherein the pad is configured for contacting the upper surface of the tabletop for enhancing coupling of the bracket to the tabletop and for preventing damage to the upper surface of the tabletop, the pads comprising at least one of rubber, silicone, and plastic, the plurality of pads comprising four pads positioned two-apiece on each of the second rods;

a pair of first caps, each first cap being positioned over an endpoint of a first section of a respective third rod distal from an associated first rod wherein the first caps are configured for protecting the tabletop from damage during placement of the bracket on the tabletop, the first caps comprising at least one of rubber, silicone, and plastic;

a pair of second caps, each second cap being coupled to a terminus of a respective second rod distal from an associated first rod wherein the second caps are configured for protecting the tabletop from damage during placement of the bracket on the tabletop, a lowermost portion of an outer surface of each second cap being coplanar with respective contact surfaces of said pads, the second caps comprising at least one of rubber, silicone, and plastic;

a pair of nubs coupled to and extending from the lower face proximate to the front edge of the plate, the nubs being positioned singly proximate to the opposing sides of the plate wherein the nubs are configured for protecting arms of the chair from damage, the nubs comprising at least one of rubber, silicone, and plastic;

a plurality of connectors, each connector being coupled to the plate and a respective second section of an associated third rod such that the respective second section is fixedly coupled to the plate, the plurality of connectors comprising four connectors coupled two-apiece to each second section, the connectors being tube strap type;

a pair of knobs, each knob being coupled to a respective adjustment screw distal from the movable jaw wherein the knob is configured for grasping in digits of a hand of a user for facilitating turning of the respective adjustment screw;

a backsplash coupled to and extending perpendicularly from the plate adjacent to the rear edge wherein the backsplash is configured for deflecting food particles and splashes back onto the plate; and a lip coupled to a perimeter of the plate, the lip extending along the opposing sides and the front edge of the plate wherein the lip and the backsplash are configured for retaining liquid spilled upon the plate, the lip having an inner face, the inner face being arcuately beveled.

* * * * *